US012735330B2

(12) United States Patent
Lu et al.

(10) Patent No.: US 12,735,330 B2
(45) Date of Patent: Sep. 15, 2026

(54) PREPARATION METHOD OF PLATY ALUMINUM-DOPED COBALT CARBONATE AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Xinghua Lu, Foshan (CN); Changdong Li, Foshan (CN); Dingshan Ruan, Foshan (CN); Genghao Liu, Foshan (CN); Yong Cai, Foshan (CN); Bin Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 540 days.

(21) Appl. No.: 18/231,805

(22) Filed: Aug. 9, 2023

(65) Prior Publication Data

US 2023/0382760 A1 Nov. 30, 2023

Related U.S. Application Data

(63) Continuation of application No. PCT/CN2022/092458, filed on May 12, 2022.

(30) Foreign Application Priority Data

Aug. 18, 2021 (CN) ......................... 202110950371.6

(51) Int. Cl.
*C01G 51/06* (2006.01)

(52) U.S. Cl.
CPC .......... *C01G 51/06* (2013.01); *C01P 2004/51* (2013.01); *C01P 2004/61* (2013.01); *C01P 2006/40* (2013.01); *C01P 2006/80* (2013.01)

(58) Field of Classification Search
CPC ..... C01G 51/06; C01G 51/42; C01P 2002/54; C01P 2002/85; C01P 2004/03;
(Continued)

(56) References Cited

FOREIGN PATENT DOCUMENTS

CN 108264095 A 7/2018
CN 109133198 A * 1/2019 ............ C01G 51/06
(Continued)

*Primary Examiner* — Daniel S Gatewood
(74) *Attorney, Agent, or Firm* — Westbridge IP LLC

(57) ABSTRACT

The present disclosure discloses a preparation method of platy aluminum-doped cobalt carbonate and use thereof. The preparation method includes the following steps: S1: mixing a cobalt salt, an aluminum salt, and a polyhydroxy compound to prepare a mixed solution; S2: mixing the mixed solution with an ammonium bicarbonate solution, adjusting a pH, and heating and stirring to allow a reaction to obtain a seed crystal solution; and S3: adding the mixed solution and an ammonium bicarbonate solution to the seed crystal solution, adjusting a pH, and heating and stirring to allow a reaction, during which a solid content in a slurry is controlled at 20% to 40% until a particle size in the slurry grows to a target value; and separating out, washing, and drying a solid phase to obtain the platy aluminum-doped cobalt carbonate.

10 Claims, 7 Drawing Sheets

(58) Field of Classification Search
CPC .............. C01P 2004/20; C01P 2004/32; C01P 2004/51; C01P 2004/61; C01P 2006/40; C01P 2006/80; C01P 2006/82; H01M 4/36; H01M 4/525; Y02E 60/10
See application file for complete search history.

(56) References Cited

FOREIGN PATENT DOCUMENTS

| | | | | | |
|---|---|---|---|---|---|
| CN | 109368709 | A | | 2/2019 | |
| CN | 111825125 | A | | 10/2020 | |
| CN | 112499693 | A | | 3/2021 | |
| CN | 113636604 | A | * | 11/2021 | ............. C01G 51/06 |
| CN | 113772746 | A | * | 12/2021 | ........ H01M 10/0525 |
| CN | 111056575 | B | * | 1/2022 | ........ H01M 10/0525 |

* cited by examiner

PREPARATION METHOD OF PLATY ALUMINUM-DOPED COBALT CARBONATE AND USE THEREOF

CROSS-REFERENCE TO RELATED APPLICATIONS

The present application is a continuation application of PCT application No. PCT/CN2022/092458 filed on May 12, 2022, which claims the benefit of Chinese Patent Application No. 202110950371.6 filed on Aug. 18, 2021. The contents of all of the aforementioned applications are incorporated by reference herein in their entirety.

TECHNICAL FIELD

The present disclosure belongs to the technical field of preparation of lithium-ion battery (LIB) cathode material precursors, and specifically relates to a preparation method of platy aluminum-doped cobalt carbonate and use thereof.

BACKGROUND

Due to high energy density, lithium cobalt oxide (LCO) cathode materials are mainly used in the 3C field. With the popularization of 5G mobile phones, requirements on the life and size of LIB continue to increase. As a precursor of an LCO cathode material, cobaltosic oxide is prepared by subjecting cobalt carbonate to thermal decomposition. The doping of aluminum in a cobalt carbonate precursor helps to stabilize a structure of a material and improve the stability of a material during a charging and discharging process at a high voltage (4.45 V and higher), thereby affecting the cycling performance and safety performance of a battery.

The related art discloses a spherical cobalt carbonate particle formed from the compounding and stacking of super large monocrystals and a preparation method thereof. However, in the preparation process, a procedure of "static settlement-supernatant removal-feeding-stopping feeding when a reactor is full" is repeated, which results in low efficiency and cumbersome operations. In addition, the related art discloses a doped basic cobalt carbonate/cobalt carbonate composite precursor and a preparation method thereof. In the method, a particle size in the reaction system is increased appropriately by steadily reducing a stirring linear speed of a reaction system, but the electron microscopy shows that flakes are formed on the surface of the cobalt carbonate particles, which affects the uniformity of aluminum distribution.

SUMMARY OF THE INVENTION

The present disclosure is intended to solve at least one of the technical problems existing in the prior art. In view of this, the present disclosure provides a preparation method of a platy aluminum-doped cobalt carbonate and use thereof.

According to one aspect of the present disclosure, a preparation method of platy aluminum-doped cobalt carbonate is provided, comprising the following steps:

- S1: mixing a cobalt salt, an aluminum salt, and a polyhydroxy compound to prepare a mixed solution;
- S2: mixing the mixed solution with an ammonium bicarbonate solution, adjusting pH, and heating and stirring to allow a reaction to obtain a seed crystal solution; and
- S3: adding the mixed solution and an ammonium bicarbonate solution to the seed crystal solution, adjusting pH, and heating and stirring a resulting slurry to allow a reaction, controlling a solid content in the slurry at 20% to 40% during the reaction until a particle size in the slurry grows to a target value; and separating out the solid phase, washing, and drying to obtain the platy aluminum-doped cobalt carbonate.

In some implementations of the present disclosure, in S1, cobalt ion in the mixed solution has a concentration of 1.8-2.2 mol/L; and preferably, a mass ratio of aluminum to cobalt in the mixed solution is 0.005-0.01.

In some implementations of the present disclosure, in S1, the cobalt salt is one or more selected from the group consisting of cobalt sulfate, cobalt nitrate, and cobalt chloride.

In some implementations of the present disclosure, in S1, the aluminum salt is aluminum sulfate.

In some implementations of the present disclosure, in S1, the polyhydroxy compound in the mixed solution has a concentration of 0.01-0.015 mol/L.

In some implementations of the present disclosure, in S1, the polyhydroxy compound is one or more selected from the group consisting of ethylene glycol (EG), glycerol, pentaerythritol, glucose, and sucrose.

In some implementations of the present disclosure, in S2, the heating is conducted at 40-45° C.

In some implementations of the present disclosure, in S2, the seed crystal has a particle size D50 of 2-8 μm.

In some implementations of the present disclosure, S2 specifically comprises: adding an ammonium bicarbonate solution as a base solution to a reactor, heating and stirring, introducing the mixed solution and an ammonium bicarbonate solution in concurrent flow to allow a reaction, adjusting a flow rate of the ammonium bicarbonate solution to control the pH of a resulting liquid during the reaction, and concentrating the liquid when the liquid level reaches a desired value until a particle size produced in the reactor grows to a target value to obtain a seed crystal.

In some implementations of the present disclosure, S3 proceeds directly in the reactor for preparing the seed crystal in S2, such that there is no need to transfer the seed crystal and the synthesis and growth of the seed crystal are completed in the same reactor, resulting in a simple production operation.

In some implementations of the present disclosure, in S2, the base solution has a concentration of 0.8-1.6 mol/L; the ammonium bicarbonate solution in the concurrent flow has a concentration of 2.0-3.0 mol/L, and is fed at a flow rate of 10-15 L/h; and the mixed solution is added at a flow rate of 20-30 L/h. Further, the base solution has a pH of 7.8 to 8.5.

In some implementations of the present disclosure, in S2, the pH is controlled at 7.4-7.6 by adjusting the flow rate of the ammonium bicarbonate solution during the reaction.

In some implementations of the present disclosure, in S2, the base solution accounts for 30%-40% of a volume of the reactor; and further, when a liquid level in the reactor reaches 80%-85% of the reactor volume, the concentrating is started.

In some implementations of the present disclosure, in S3, the ammonium bicarbonate solution has a concentration of 2.0-3.0 mol/L, and is added at a flow rate of 40-60 L/h; and the mixed solution is added at a flow rate of 20-30 L/h. It should be noted that the flow rate of the ammonium bicarbonate solution is controlled by PLC, and in an actual reaction, an output flow rate range of the ammonium bicarbonate solution controlled by PLC is 40 L/h to 60 L/h.

In some implementations of the present disclosure, in S3, the pH is 7.2-7.4. Specifically, the flow rate of the ammonium bicarbonate solution is adjusted by a PLC control system to maintain the pH during the seed crystal growth stage is at 7.2-7.4.

In some implementations of the present disclosure, in S3, the heating is conducted at 45° C. The low reaction temperature results in low energy consumption.

In some implementations of the present disclosure, in S3, the platy aluminum-doped cobalt carbonate has a particle size D50 of 10-18 μm. Preferably, the platy aluminum-doped cobalt carbonate has an aluminum content of 2,300 ppm to 4,800 ppm.

In some implementations of the present disclosure, in S3, the washing is conducted for min with hot water of 80° C. to 85° C.

In some implementations of the present disclosure, in S3, the drying is conducted at 110-120° C. until a moisture content in a dried product is lower than 1%.

In some implementations of the present disclosure, after the drying, S3 further comprises a sieving procedure with a screen of a mesh size of 350 to 450.

In some implementations of the present disclosure, inlet pipes of the reactor for the mixed solution and the ammonium bicarbonate solution are both equipped with a spray device in which a spray port directly faces a stirring blade, which allows the precipitation and crystallization to proceed rapidly, promotes the growth of flaky crystal grains, and avoids the production of crystalline products with a crystal form different from the flake crystal form due to large local supersaturation at a feeding end.

The present disclosure also provides use of the preparation method described above in the preparation of an LCO cathode material.

According to a preferred implementation of the present disclosure, the present disclosure at least has the following beneficial effects:

1. In the present disclosure, a polyhydroxy compound is added to change a chemical potential and a particle movement rate of a solution and change a crystal growth environment, thereby affecting the growth of crystal planes. Moreover, the polyhydroxy compound has a strong crystallization induction ability, and can bind to product particles through a hydrogen bond to affect a growth rate of the particles in a specified direction, such that the particles grow in a specified direction to form a specific morphology and thus aluminum-doped cobalt carbonate has vertically-grown flaky crystals, thus realizing the crystal transformation.

2. In the present disclosure, a slurry concentration is controlled in a range of 20% to 40% to increase a rate at which a crystal nucleus is formed through the collision, adsorption, and fusion among solute molecules. Due to a small amount of a seed crystal, under stirring and Brownian movement, a large number of newly formed flaky crystal nuclei are easily diffused and adsorbed uniformly on a surface of each seed crystal grain, thereby forming compact flaky crystals. A too-low slurry concentration corresponds to a too-low production capacity. When a slurry concentration is too high, that is, there is a large amount of a seed crystal, under the same conditions, a single seed crystal grain can adsorb few flaky crystals that are scattered on the surface of the grain, resulting in an incomplete crystal form.

3. In the present disclosure, there is no need to change a pH, a temperature, and a stirring speed during a synthesis process of aluminum-doped cobalt carbonate, and no new impurity elements are introduced; the complete transformation of aluminum-doped cobalt carbonate crystal forms with different particle sizes can be achieved by adding a polyhydroxy compound and controlling a slurry concentration in a system; and the prepared aluminum-doped cobalt carbonate has prominent consistency, regular appearance, uniform aluminum distribution, no significant aluminum enrichment, no micropowder, and concentrated particle size distribution.

BRIEF DESCRIPTION OF THE DRAWINGS

The present disclosure is further described below with reference to accompanying drawings and examples.

DETAILED DESCRIPTION OF ILLUSTRATED EXAMPLES

Figure 1:
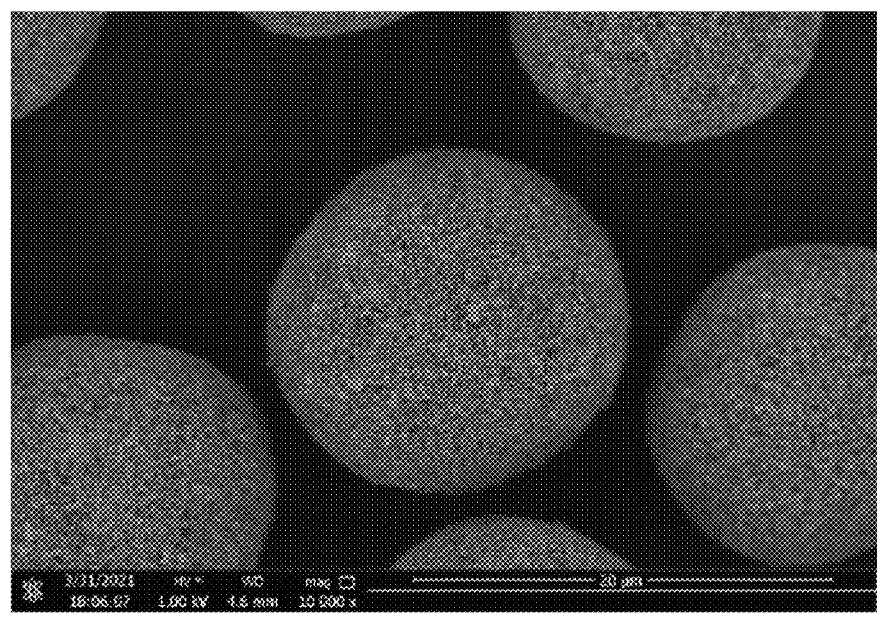
FIG. 1 is a scanning electron microscopy (SEM) image of the aluminum-doped cobalt carbonate of Example 1 of the present disclosure at a magnification of 10,000.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

In this example, platy aluminum-doped cobalt carbonate was prepared, and a specific preparation process was as follows:

(1) Preparation of solutions: A cobalt salt, an aluminum salt, and EG were mixed to prepare a mixed solution, where in the mixed solution, cobalt had a concentration of 2.2 mol/L, a mass ratio of aluminum to cobalt was 0.008, and EG had a concentration of 0.0015 mol/L; and an ammonium bicarbonate solution with a concentration of 2.52 mol/L was prepared.

(2) Synthesis of a seed crystal: An ammonium bicarbonate solution with a concentration of 0.8 mol/L was added as a base solution to a reactor, where a volume of the base solution accounted for 40% of a total volume of the reactor and a pH of the base solution was 8.2; heating and stirring of the reactor were started simultaneously; when a temperature rose to 45° C., the mixed solution (at a flow rate of 25 L/h) and an ammonium bicarbonate solution (at a flow rate of 12 L/h) were concurrently fed; when a pH decreased to 7.40, the flow rate of the ammonium bicarbonate solution was adjusted through a PLC control system to stabilize the pH at 7.40; when a liquid level in the reactor was 80% to 85% of the total volume of the reactor, concentration was started, during which the mixed solution and the ammonium bicarbonate solution were continuously fed and the liquid level in the reactor was stabilized at 80% to 85% of the total volume of the reactor; and when a particle size D50 grew to 10 μm, the concurrent feeding and the concentration were stopped to complete the synthesis of the seed crystal.

(3) Growth of the seed crystal: When the reaction temperature rose to 50° C., the mixed solution and an ammonium bicarbonate solution were concurrently fed, and concentration was started at the same time, during which the mixed solution and the ammonium bicarbonate solution were continuously fed and the liquid level in the reactor was stabilized at 80% to 85% of a total volume of the reactor; and when a particle size grew to 18 μm, an aluminum-doped cobalt carbonate slurry was obtained. A flow rate of the mixed solution was 25 L/h, and a flow rate of the ammonium bicarbonate solution was adjusted through a PLC control system to keep a pH in the seed crystal growth stage constant at 7.20 and control a slurry concentration in the system at 35% to 40%. If the slurry concentration exceeded the upper limit, the concentration was paused, the slurry was divided into two parts and one part was transferred out of the reactor, then the concurrent feeding continued until a liquid level reached 80% to 85% of a total volume, and then concentration was started once again.

(4) Washing, drying, and sieving of aluminum-doped cobalt carbonate: The slurry in the reactor was centrifuged in a centrifuge and filtered, and a resulting filter cake was washed with hot pure water at 85° C. for 60 min, then filtered out, dried at 110° C. to a moisture content of 0.24%, then sieved through a 400-mesh vibrating sieve, and packaged to obtain a finished product of aluminum-doped cobalt carbonate. The finished product had a particle size D50 of 18 μm, a particle size distribution span of 0.301, and an aluminum content of 3,782 ppm.

Figure 2:
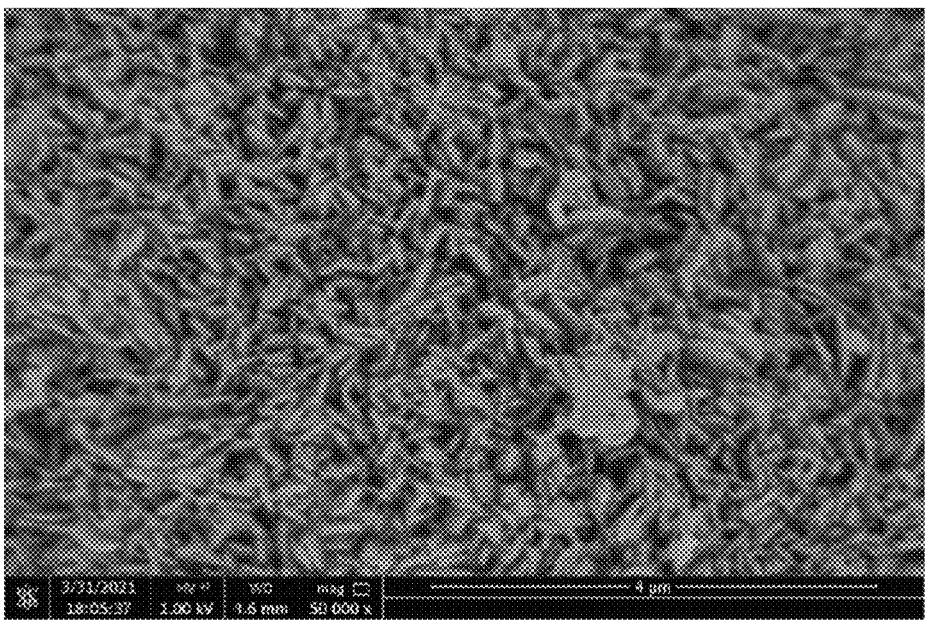
FIG. 2 is an SEM image of the aluminum-doped cobalt carbonate of Example 1 of the present disclosure at a magnification of 50,000.
Figure 3:
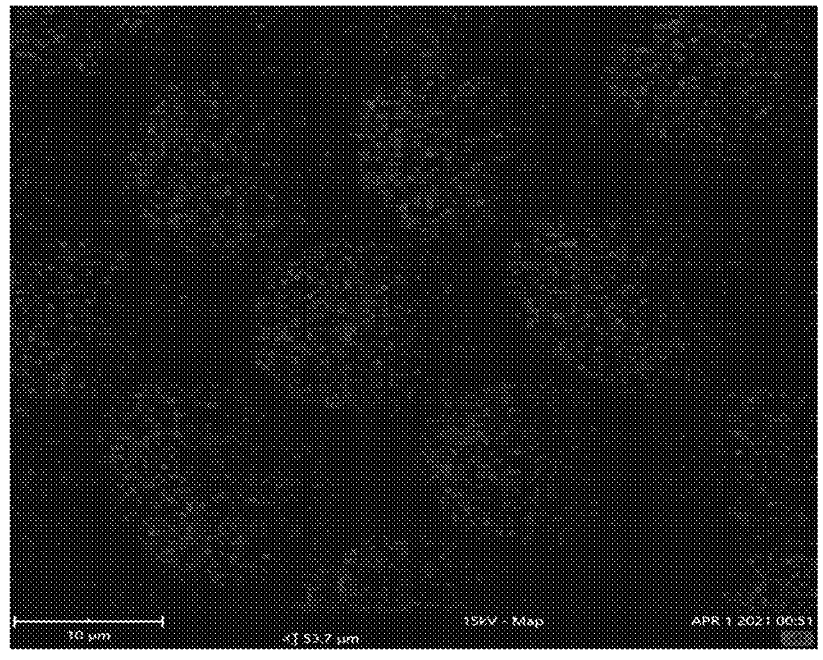
FIG. 3 is an energy dispersive spectroscopy (EDS) spectrum of aluminum in the aluminum-doped cobalt carbonate of Example 1 of the present disclosure.

FIG. 1 and FIG. 2 are SEM images of the aluminum-doped cobalt carbonate obtained in this example at magnifications of 10,000 and 50,000, respectively, and it can be seen from the images that the particles have high sphericity, prominent consistency, concentrated particle size distribution, no micropowder, and flaky primary particles. FIG. 3 is an EDS spectrum of aluminum in the aluminum-doped cobalt carbonate in this example, and the EDS shows a uniform aluminum distribution.

Example 2

In this example, platy aluminum-doped cobalt carbonate was prepared, and a specific preparation process was as follows:

(1) Preparation of solutions: A cobalt salt, an aluminum salt, and glycerol were mixed to prepare a mixed solution, where in the mixed solution, cobalt had a concentration of 2.0 mol/L, a mass ratio of aluminum to cobalt was 0.01, and glycerol had a concentration of 0.0012 mol/L; and an ammonium bicarbonate solution with a concentration of 3 mol/L was prepared.

(2) Synthesis of a seed crystal: An ammonium bicarbonate solution with a concentration of 1.0 mol/L was added as a base solution to a reactor, where a volume of the base solution accounted for 30% of a total volume of the reactor and a pH of the base solution was 8.3; heating and stirring of the reactor were started simultaneously; when a temperature rose to 43° C., the mixed solution (at a flow rate of 30 L/h) and an ammonium bicarbonate solution (at a flow rate of 15 L/h) were concurrently fed; when a pH decreased to 7.50, the flow rate of the ammonium bicarbonate solution was adjusted through a PLC control system to stabilize the pH at 7.50; when a liquid level in the reactor was 80% of the total volume of the reactor, concentration was started, during which the mixed solution and the ammonium bicarbonate solution were continuously fed and the liquid level in the reactor was stabilized at 80% to 85% of the total volume of the reactor; and when a particle size D50 grew to 8 μm, the concurrent feeding and the concentration were stopped to complete the synthesis of the seed crystal.

(3) Growth of the seed crystal: When the reaction temperature rose to 48° C., the mixed solution and an ammonium bicarbonate solution were concurrently fed, and concentration was started at the same time, during which the mixed solution and the ammonium bicarbonate solution were continuously fed and the liquid level in the reactor was stabilized at 80% to 85% of a total volume of the reactor; and when a particle size grew to 17.5 μm, an aluminum-doped cobalt carbonate slurry was obtained. A flow rate of the mixed solution was 30 L/h, and a flow rate of the ammonium bicarbonate solution was adjusted through a PLC control system to keep a pH in the seed crystal growth stage constant at 7.30 and control a slurry concentration in the system at 30% to 35%. If the slurry concentration exceeded the upper limit, the concentration was paused, the slurry was divided into two parts and one part was transferred out of the reactor, then the concurrent feeding continued until a liquid level reached 80% to 85% of a total volume, and then concentration was started once again.

(4) Washing, drying, and sieving of aluminum-doped cobalt carbonate: The slurry in the reactor was centrifuged in a centrifuge and filtered, and a resulting filter cake was washed with hot pure water at 80° C. for 40 min, then filtered out, dried at 110° C. to a moisture content of 0.78%, then sieved through a 400-mesh vibrating sieve, and packaged to obtain a finished product of aluminum-doped cobalt carbonate. The finished product had a particle size D50 of 17.5 μm, a particle size distribution span of 0.325, and an aluminum content of 4,680 ppm.

Figure 4:
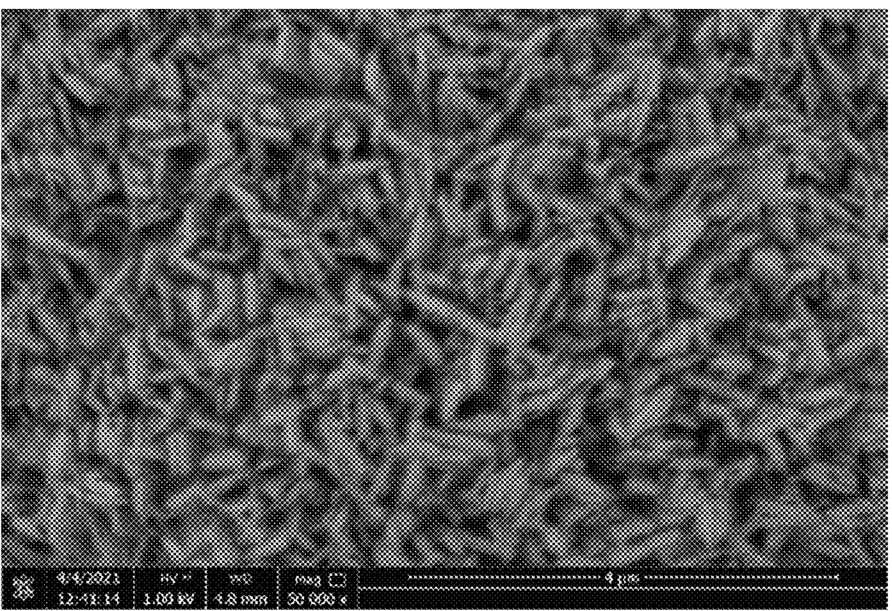
FIG. 4 is an SEM image of the aluminum-doped cobalt carbonate of Example 2 of the present disclosure at a magnification of 50,000.
Figure 5:
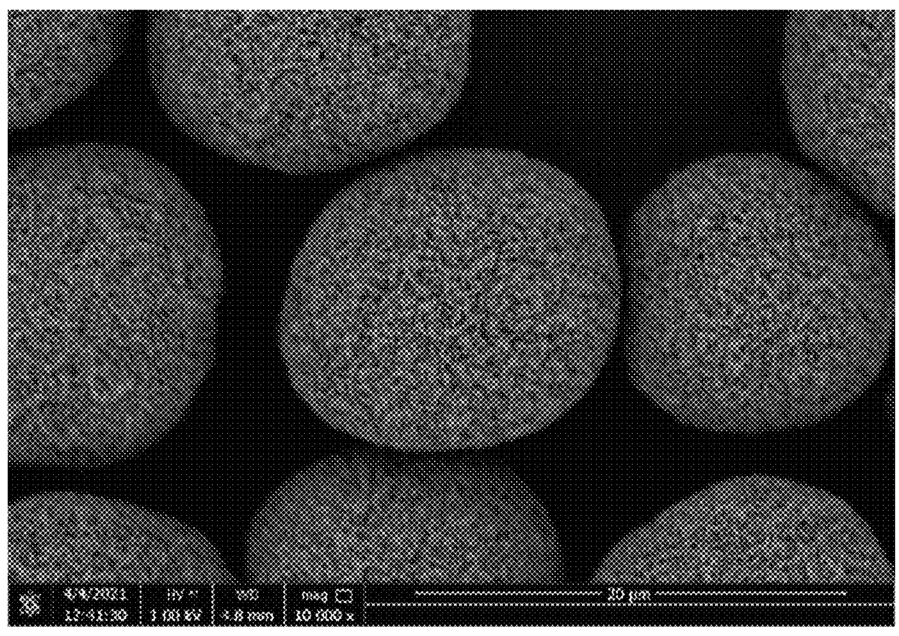
FIG. 5 is an SEM image of the aluminum-doped cobalt carbonate of Example 2 of the present disclosure at a magnification of 10,000.

FIG. 4 and FIG. 5 are SEM images of the aluminum-doped cobalt carbonate obtained in this example at magnifications of 50,000 and 10,000, respectively, and it can be seen from the images that the particles have high sphericity, prominent consistency, concentrated particle size distribution, no micropowder, and flaky primary particles.

Example 3

In this example, platy aluminum-doped cobalt carbonate was prepared, and a specific preparation process was as follows:

(1) Preparation of solutions: A cobalt salt, an aluminum salt, and glucose were mixed to prepare a mixed solution, where in the mixed solution, cobalt had a concentration of 1.9 mol/L, a mass ratio of aluminum to cobalt was 0.005, and glucose had a concentration of 0.0012 mol/L; and an ammonium bicarbonate solution with a concentration of 2 mol/L was prepared.

(2) Synthesis of a seed crystal: An ammonium bicarbonate solution with a concentration of 1.6 mol/L was added as a base solution to a reactor, where a volume of the base solution accounted for 30% of a total volume of the reactor and a pH of the base solution was 8.5; heating and stirring of the reactor were started simultaneously; when a temperature rose to 40° C., the mixed solution (at a flow rate of 20 L/h) and an ammonium bicarbonate solution (at a flow rate of 10 L/h) were concurrently fed; when a pH decreased to 7.60, the flow rate of the ammonium bicarbonate solution was adjusted through a PLC control system to stabilize the pH at 7.60; when a liquid level in the reactor was 80% to 85% of the total volume of the reactor, concentration was started, during which the mixed solution and the ammonium bicarbonate solution were continuously fed and the liquid level in the reactor was stabilized at 80% to 85% of the total volume of the reactor; and when a particle size D50 grew to 2 the concurrent feeding and the concentration were stopped to complete the synthesis of the seed crystal.

(3) Growth of the seed crystal: When the reaction temperature rose to 45° C., the mixed solution and an ammonium bicarbonate solution were concurrently fed, and concentration was started at the same time, during which the mixed solution and the ammonium bicarbonate solution were continuously fed and the liquid level in the reactor was stabilized at 80% to 85% of a total volume of the reactor; and when a particle size grew to 8 an aluminum-doped cobalt carbonate slurry was obtained. A flow rate of the mixed solution was 20 L/h, and a flow rate of the ammonium bicarbonate solution was adjusted through a PLC control system to keep a pH in the seed crystal growth stage constant at 7.40 and control a slurry concentration in the system at 20% to 25%. If the slurry concentration exceeded the upper limit, the concentration was paused, the slurry was divided into two parts and one part was transferred out of the reactor, then the concurrent feeding continued until a liquid level reached 80% to 85% of a total volume, and then concentration was started once again.

(4) Washing, drying, and sieving of aluminum-doped cobalt carbonate: The slurry in the reactor was centrifuged in a centrifuge and filtered, and a resulting filter cake was washed with hot pure water at 80° C. for 40 min, then filtered out, dried at 110° C. to a moisture content of 0.78%, then sieved through a 300-mesh vibrating sieve, and packaged to obtain a finished product of aluminum-doped cobalt carbonate. The finished product had a particle size D50 of 8 μm, a particle size distribution span of 0.382, and an aluminum content of 2338 ppm.

Figure 6:
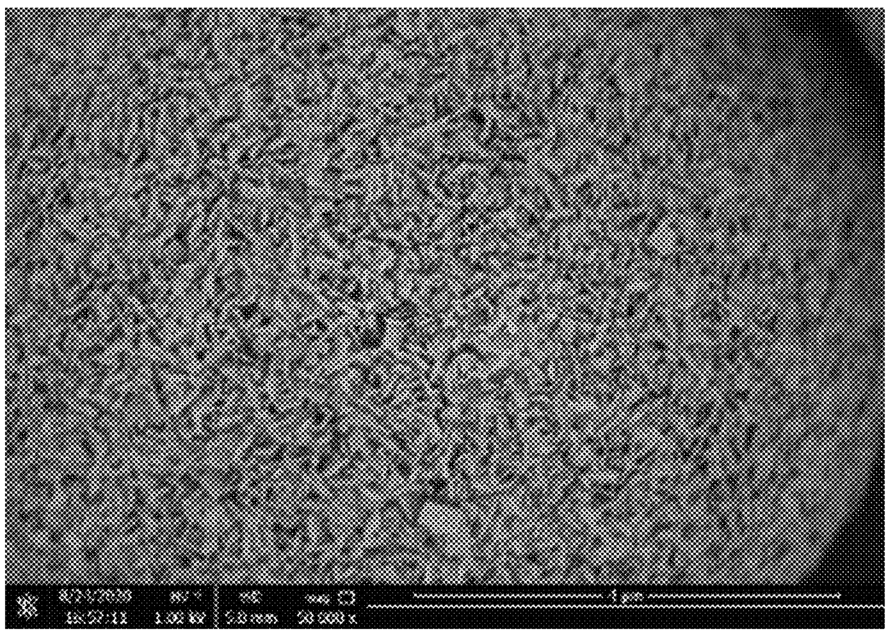
FIG. 6 is an SEM image of the aluminum-doped cobalt carbonate of Example 3 of the present disclosure at a magnification of 50,000.

FIG. 6 is an SEM image of the aluminum-doped cobalt carbonate obtained in this example at a magnification of 50,000, and it can be seen from the image that the particles have high sphericity, prominent consistency, concentrated particle size distribution, no micropowder, and flaky primary particles.

Comparative Example 1

In this comparative example, aluminum-doped cobalt carbonate was prepared. This comparative example was different from Example 1 in that no EG was added to the mixed solution and prepared aluminum-doped cobalt carbonate had an aluminum content of 3,849 ppm and a particle size D50 of 17.3 μm.

Figure 7:
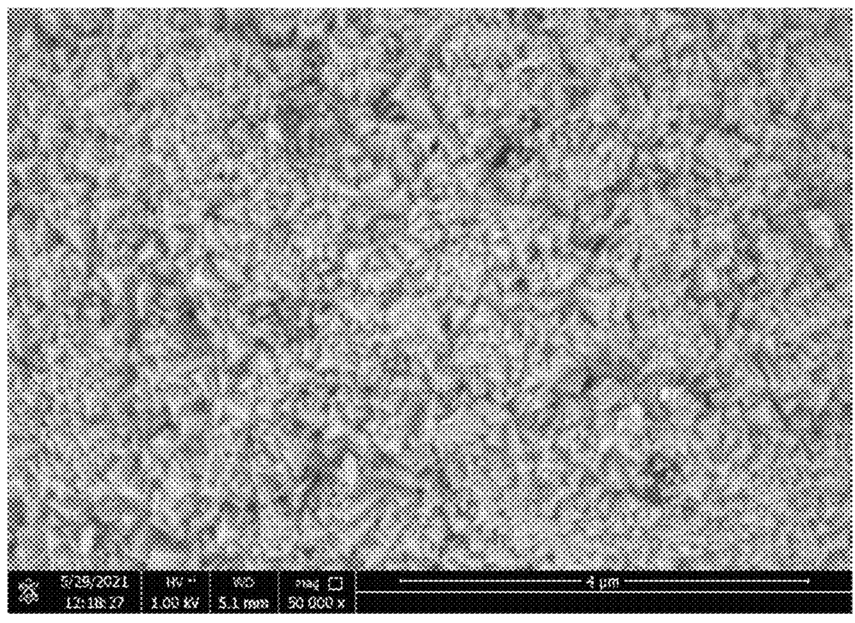
FIG. 7 is an SEM image of the aluminum-doped cobalt carbonate of Comparative Example 1 of the present disclosure at a magnification of 50,000.
Figure 8:
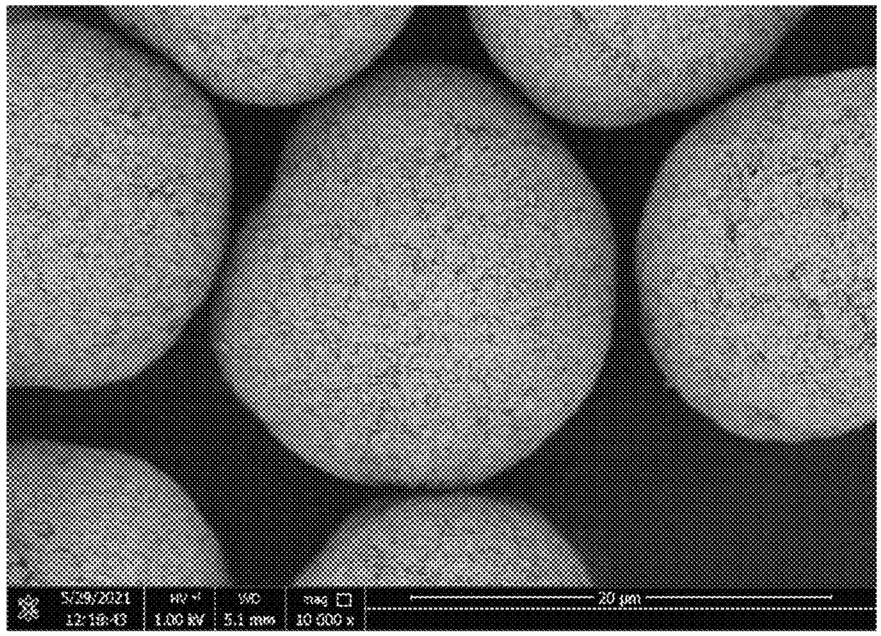
FIG. 8 is an SEM image of the aluminum-doped cobalt carbonate of Comparative Example 1 of the present disclosure at a magnification of 10,000.

FIG. 7 and FIG. 8 are SEM images of the aluminum-doped cobalt carbonate obtained in this comparative example at magnifications of 50,000 and 10,000, respectively, and it can be seen from the images that primary particles of this product are powdery.

Comparative Example 2

In this comparative example, aluminum-doped cobalt carbonate was prepared. This comparative example was different from Example 3 in that no glucose was added to the mixed solution and prepared aluminum-doped cobalt carbonate had an aluminum content of 2,480 ppm and a particle size D50 of 9 μm.

Figure 9:
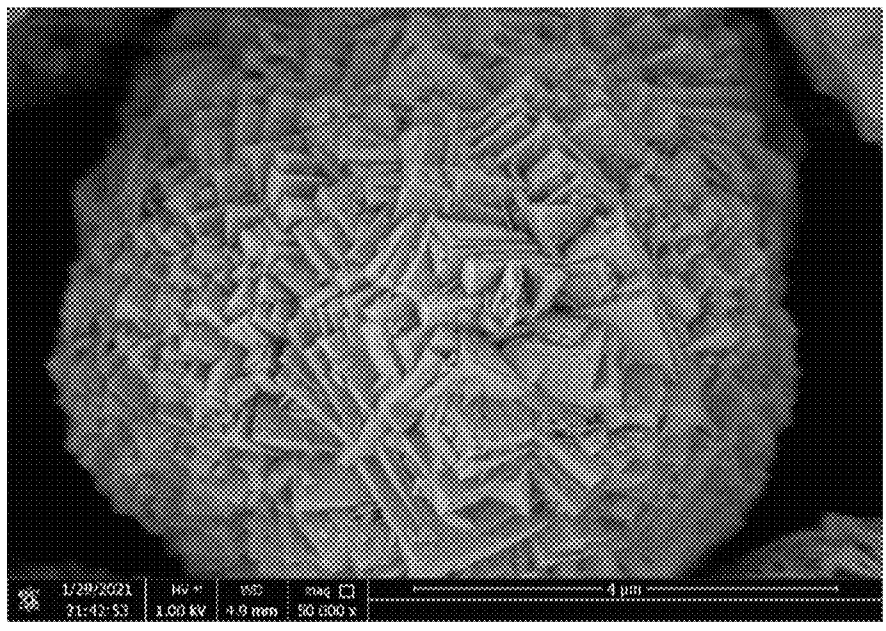
FIG. 9 is an SEM image of the aluminum-doped cobalt carbonate of Comparative Example 2 of the present disclosure at a magnification of 50,000.
Figure 10:
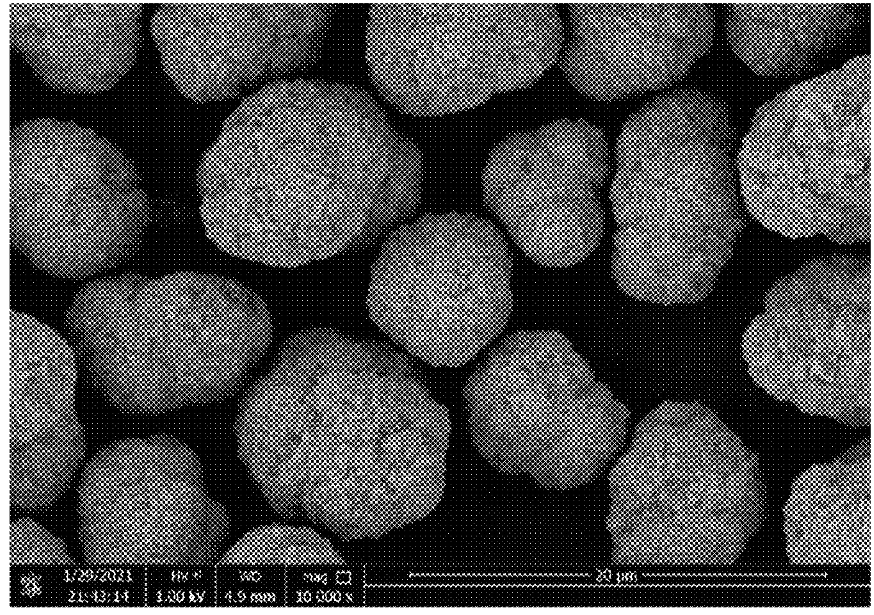
FIG. 10 is an SEM image of the aluminum-doped cobalt carbonate of Comparative Example 2 of the present disclosure at a magnification of 10,000.

FIG. 9 and FIG. 10 are SEM images of the aluminum-doped cobalt carbonate obtained in this comparative example at magnifications of 50,000 and 10,000, respectively, and it can be seen from the images that primary particles of this product are peak-like blocks.

Comparative Example 3

In this comparative example, aluminum-doped cobalt carbonate was prepared. This comparative example was different from Example 2 in that a slurry concentration of the system in the seed crystal growth stage of step (3) was controlled at 50% to 60% and prepared aluminum-doped cobalt carbonate had an aluminum content of 4,720 ppm and a particle size D50 of 17 μm.

Figure 11:
FIG. 11 is an SEM image of the aluminum-doped cobalt carbonate of Comparative Example 3 of the present disclosure at a magnification of 50,000.
Figure 11:
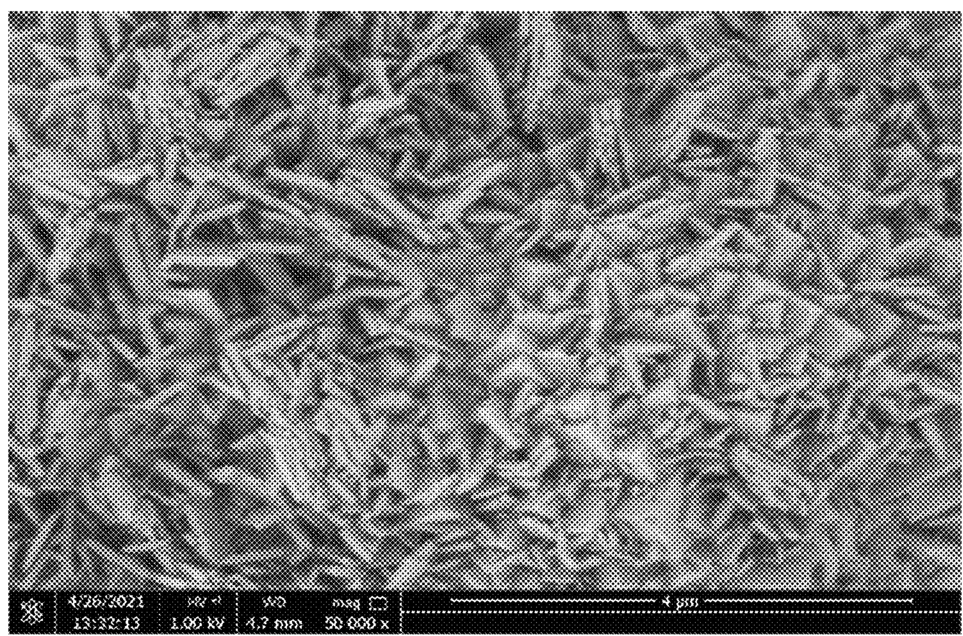
Figure 12:
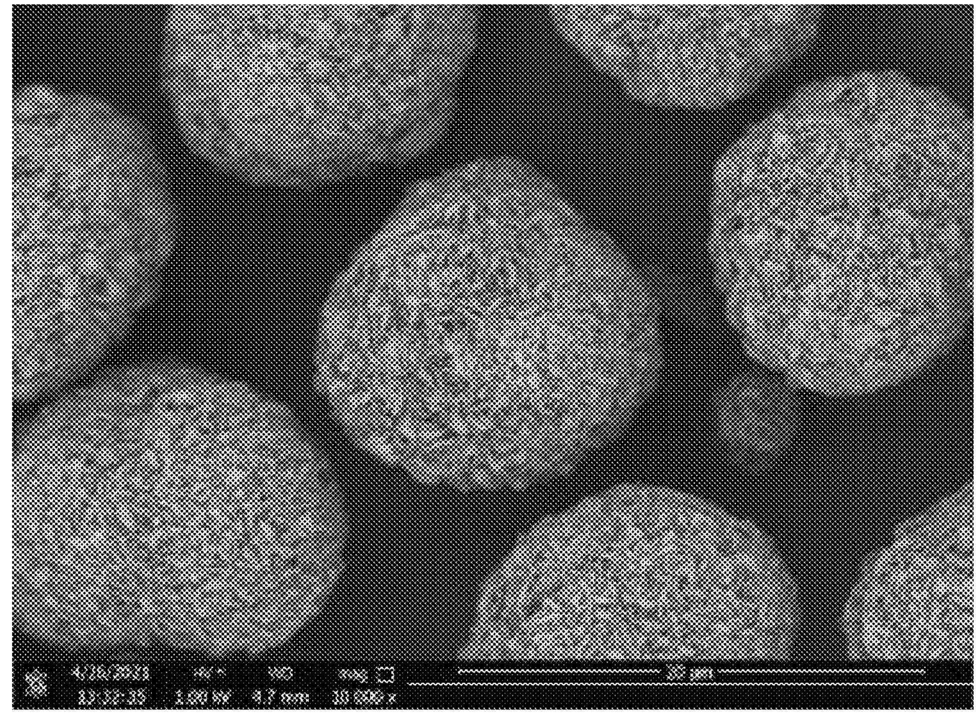
FIG. 12 is an SEM image of the aluminum-doped cobalt carbonate of Comparative Example 3 of the present disclosure at a magnification of 10,000.

FIG. 11 and FIG. 12 are SEM images of the aluminum-doped cobalt carbonate obtained in this comparative example at magnifications of 50,000 and 10,000, respectively, and it can be seen from the images that there are only scattered flaky crystals on the surface of particles, indicating incomplete crystal transformation. This is because a too-high slurry concentration leads to a compressed growth space for particles, making it difficult for newly formed crystal nuclei to grow uniformly on the surface of large particles. Small particles can be seen in the SEM images.

Comparative Example 4

In this comparative example, aluminum-doped cobalt carbonate was prepared. This comparative example was different from Example 3 in that a slurry concentration of the system in the seed crystal growth stage of step (3) was controlled at 40% to 50% and prepared aluminum-doped cobalt carbonate had an aluminum content of 2,344 ppm and a particle size D50 of 10 μm.

Figure 13:
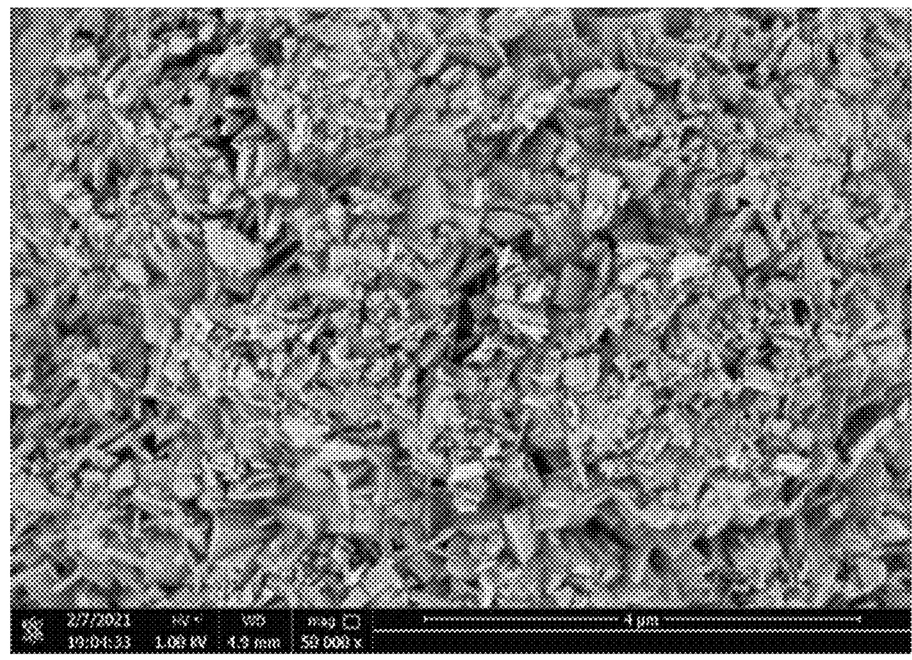
FIG. 13 is an SEM image of the aluminum-doped cobalt carbonate of Comparative Example 4 of the present disclosure at a magnification of 50,000.

FIG. 13 is an SEM image of the aluminum-doped cobalt carbonate obtained in this comparative example at a magnification of 50,000, and it can be seen from the image that there are only scattered flaky crystals on the surface of particles, indicating incomplete crystal transformation.

CONCLUSION

It can be seen from the examples and comparative examples that the addition of the polyhydroxy compound allows the transformation of a crystal form of aluminum-doped cobalt carbonate; and the slurry concentration and the seed crystal particle size can be controlled to prepare platy aluminum-doped cobalt carbonate samples with different particle sizes and complete crystal transformation.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A preparation method of platy aluminum-doped cobalt carbonate, comprising the following steps:

S1: mixing a cobalt salt, an aluminum salt, and a polyhydroxy compound to prepare a mixed solution;

S2: mixing the mixed solution with an ammonium bicarbonate solution, adjusting pH, and heating and stirring to allow a reaction to obtain a seed crystal solution; and S3: adding the mixed solution and an ammonium bicarbonate solution to the seed crystal solution, adjusting pH, and heating and stirring a resulting slurry to allow a reaction, controlling a solid content in the slurry at 20%-40% during the reaction until a particle size in the slurry grows to a target value; and separating out a solid phase, washing, and drying to obtain the platy aluminum-doped cobalt carbonate.

2. The preparation method according to claim 1, wherein in S1, cobalt ion in the mixed solution has a concentration of 1.8-2.2 mol/L; and preferably, a mass ratio of aluminum to cobalt in the mixed solution is 0.005-0.01.

3. The preparation method according to claim 1, wherein in S1, the polyhydroxy compound in the mixed solution has a concentration of 0.01-0.015 mol/L.

4. The preparation method according to claim 1, wherein in S2, a seed crystal has a particle size D50 of 2-8 μm.

5. The preparation method according to claim 1, wherein S2 specifically comprises: adding the ammonium bicarbonate solution as a base solution to a reactor, heating and stirring, and feeding the mixed solution and the ammonium bicarbonate solution in concurrent flow to allow a reaction, adjusting a flow rate of the ammonium bicarbonate solution to control the pH of a resulting liquid during the reaction, and concentrating the liquid when the liquid level in the reactor reaches a desired value; performing the reaction until a particle size of a product grows to a target value to obtain a seed crystal.

6. The preparation method according to claim 5, wherein in S2, the base solution has a concentration of 0.8-1.6 mol/L; the ammonium bicarbonate solution fed concurrently with the mixed solution has a concentration of 2.0-3.0 mol/L, and is added at a flow rate of 10-15 L/h; and the mixed solution is added at a flow rate of 20 L/h to 30 L/h.

7. The preparation method according to claim 1, wherein in S3, the ammonium bicarbonate solution has a concentration of 2.0 3.0 mol/L, and is added at a flow rate of 40-60 L/h; and the mixed solution is added at a flow rate of 20-30 L/h.

8. The preparation method according to claim 1, wherein in S3, the pH is 7.2-7.4.

9. The preparation method according to claim 1, wherein in S3, the platy aluminum-doped cobalt carbonate has a particle size D50 of 10-18.

10. The preparation method according to claim 3, wherein the polyhydroxy compound is one or more selected from the group consisting of ethylene glycol, glycerol, pentaerythritol, glucose, and sucrose.

* * * * *